Patented Aug. 8, 1933

1,921,297

UNITED STATES PATENT OFFICE 1,921,297

PROCESS OF MANUFACTURING ACTIVATED CARBON

Frederick E. Kern, St. Louis, Mo.

No Drawing. Application June 18, 1930
Serial No. 462,124

8 Claims. (Cl. 252—3)

This invention relates to a process for producing activated carbon, and with regard to certain more specific features, to a process utilizing as raw materials a variety of vegetable substances.

Among the several objects of the invention may be noted a provision of the process of the class described which as a first step destroys the cellular structure of the raw material, thereby reducing it to a condition wherein it is more readily and thoroughly activated, a process of the class described wherein the treating materials used, such as acids, are reclaimed to a maximum extent, a process wherein all of the utilizable portions of the raw material are ultimately recombined to effect an improved product; a process of the class described which is equally adaptable to treatment of a wide variety of raw materials; a process for manufacturing an activated carbon product which has unusually great color adsorbing properties, and which is produced in a physical state of maximum utility; and a process of the class described which is economical and advantageous to operate. Other objects will be in part obvious and in part pointed out hereinafter.

The invention accordingly comprises the elements and combinations of elements, steps and sequence of steps, features of snythesis, and arrangements which will be exemplified in the procedures hereinafter described, and the scope of the application of which will be indicated in the following claims.

According to the present invention, the raw material for conversion into activated carbon comprises a vegetable substance such as wood, cellulose and the like. The type of raw vegetable material utilized is inconsequential.

The raw material is preferably first pulverized or comminuted to as great a degree as practically possible. Wood, for example, is preferably reduced to the form of a fine sawdust. The subdivided or comminuted raw material is next deprived of its cellular structure, by a treatment with suitable mineral acids, either diluted or concentrated, depending upon the character and state of sub-division o. the raw material. The mineral acid employed should not be of a character, or concentration, such as to occasion any substantial charring or carbonization of the raw material, because such charring or carbonization is detrimental to the subsequent activating procedure. Hydrochloric acid, I have found, is eminently satisfactory, as it functions well to destroy the cellular structure of the raw material but does not occasion charring or carbonization. Solutions of acid salts, such as sodium sulphite, sodium bisulphate and sodium thiosulphate may be used in place of the mineral acids.

In the case of certain vegetable raw materials, such as pine wood, the resin content may be so high as to render a treatment with alkaline solutions, prior to the acid treatment, desirable. In such cases, I prefer to use solutions of alkalies such as ammonium and sodium carbonate, which will dissolve the resinous constituents without removing appreciable amounts of lignin constituents. The acid treatment described then follows.

The acid treatment is preferably accomplished by changing the raw material into a digester, and then adding the acids, or salts, in quantities sufficient to cover the entire mass of the raw material and establish an intimate contact therethrough. The acid may vary from 10 to 200% or more of the raw material by weight.

The raw material is preferably allowed to saturate with the acid or salts for a period of from 24 to 48 hours and is thereafter subjected to a cooking process for several hours. The cooking process is preferably accomplished by a treatment with live steam under pressure, and the temperature is gradually brought to the order of 125° to 130° C.

In the cooking process, the acid decomposes the vegetable material and separates and dissolves the lignin constituents, as well as the sugars, resins, terpenes, and mineral constituents, from the cellulose constituents. Accordingly, the cellular structure of the vegetable material is destroyed, and the material becomes amorphous in structure. This amorphous vegetable cellulose material, I have found, is far more susceptible to ready activation than the usual cellular structure vegetable material.

After the cooking operation is continued for a period of the order of several hours, the acid liquor which contains dissolved therein quantities of the mineral, lignin, sugar, resin, and terpene components of the vegetable material, becomes a reddish brown in color, and assumes a very penetrating odor.

After the cooking operation has been completed, which is determined by the substantially complete disintegration of the vegetable material, the red or acid liquor may be drawn from the amorphous or non-resilient cellulose material, and conducted to a reclaimer or evaporator. In the evaporator, this acid liquor is subjected to temperatures sufficient to vaporize the majority of the excess of acid, which is collected, condensed, and utilized for further treatment of raw material. Evaporation is preferably continued until a heavy black liquid is obtained. This black liquid is then preferably, although not necessarily, recombined with the amorphous cellulose material. It is to be understood that the evaporation described may also be carried out with the liquor in contact with the vegetable residues; in such instances, as drawing off is necessary.

The cellulose and lignin and other constituents of the wood are thus recombined and are both present in the mass which is subsequently subjected to activation. The combined black concentrated liquid and amorphous cellulose material, after thorough intermixing is evaporated to dryness. The dried mass is then pulverized.

The pulverized mass is next activated by cooking it with phosphoric acid. I have found that the process of destroying the cellular structure of the raw material set forth hereinbefore renders the raw material more subject to activation, and considerably less phosphoric acid is necessary than in processes known to the art. I obtain such desirable results with quantities of phosphoric acid up to 100% by weight of the pulverized organic material.

The second cooking is continued until the organic material is converted into a black pulp having a distinctly plastic consistency. This second cooking process is preferably continued for a period of the order of five hours, and at temperatures approaching 160° C. After the cooking, the mass is subjected to evaporation and the phosphoric acid in the vapors is condensed and reclaimed for use in activating further organic, amorphous material.

The evaporation is continued after the mass substantially loses its liquid character until it becomes heavy and pasty, or plastic. The plastic mass is preferably then moulded into briquettes, or shapes, by methods known to the art.

The briquettes are then subjected to a carbonizing step, in which they are heated to temperatures of the order of 600° C. During the carbonization, the residual phosphoric acid is evaporated and recovered and the volatile constituents of the wood, such as acetic acid, methanol, turpentine, light oils, fixed gases, and the like are vaporized and recovered. The activating influence of the phosphoric acid seems to increase as the temperature of coking or carbonizing increases. This continues until the phosphoric acid has been substantially or entirely evaporated.

The activating influence of the phosphoric acid, I believe, is due to the ultramicroscopic porosity which it sets up in the carbonaceous material, either alone or in combination with the prior treatment with other acids.

The activating or second cooking and the carbonizing steps may readily be combined into a single step, in which the temperature is held at a low point until evaporation is substantially complete, and then raised to effect the coking or carbonizing. Such a combined step is readily carried out in a single piece of apparatus.

The carbonized briquette or char obtained from the carbonization process is hard, has a clean, glossy appearance, and possesses considerable mechanical strength. It may be used in this briquette form as an activated coke or as a filter material, or, more preferably, it is pulverized, thoroughly washed to neutrality, and very slightly acidulated with dilute phosphoric or hydrochloric acid or the like. The finely divided product is then dried. The dried powder is an unusually active form of carbon for decolorizing and deodorizing purposes, filtration of caramel solutions, production of refined sugar, clarification of gasoline, and, in general, all of the usual uses of activated carbon.

It may be advantageous under some conditions to subject the pulverized product to a slight surface oxidation as with air or steam. This procedure is not essential in the production of ordinary activated carbon.

It will be seen that both the acid used in the decomposing process and the phosphoric acid used in the activation process are substantially entirely reclaimed. The cost of the process is therefore minimized. In the carbonization process the evolved volatile constituents of the vegetable substance are recovered and comprise valuable by-products.

In view of the above, it will be seen that the several objects of the invention are achieved and other advantageous results attained.

As many changes could be made in carrying out the above procedures without departing from the scope of the invention, it is intended that all matter contained in the above description shall be interpreted as illustrative and not in a limiting sense.

I claim:

1. The process of preparing activated carbon which comprises comminuting a vegetable substance, acidifying and cooking said comminuted material to destroy the cellular structure without substantial charring thereof, and activating said material by cooking it with phosphoric acid.

2. The process of preparing activated carbon which comprises reducing vegetable material to an amorphous, non-cellular non-charred condition, and activating the amorphous material with phosphoric acid.

3. The process of preparing activated carbon which comprises comminuting a vegetable substance, acidifying said comminuted material to destroy the cellular structure thereof, whereby said vegetable material is reduced to an amorphous condition, treating said amorphous material with phosphoric acid to activate the same, evaporating the excess phosphoric acid, and carbonizing the activated material.

4. The process of preparing activated carbon which comprises destroying the cellular structure of a vegetable material with hydrochloric acid, treating said vegetable material to a carbonization step whereby the excess acids and volatile constituents are evaporated therefrom and an activated char product is obtained, comminuting the activated char and washing the same.

5. A process of preparing activated carbon which comprises destroying the cellular structure of a vegetable material whereby said material is reduced to an amorphous condition, treating said amorphous vegetable material with phosphoric acid to activate the same and cooking until the vegetable material reaches a plastic condition, and subjecting said plastic amorphous material to a carbonization temperature whereby an activated carbon product is obtained.

6. The process of preparing activated carbon which comprises comminuting a vegetable substance, treating said vegetable substance with acids whereby the cellular structure thereof is broken down and portions of said vegetable materials dissolved by said acid, evaporating said acid to a thick consistency and recombining the evaporated acid with the remaining raw material, drying said combined acid and material to form an amorphous material, comminuting said amorphous material and treating it with phosphoric acid, thereby to activate said material, evaporating the excess phosphoric acid, moulding the activated material into briquettes, and subjecting said briquettes to carbonization.

7. The process of preparing activated carbon which comprises cooking sawdust with hydrochloric acid until the cellular structure of the sawdust is destroyed, drawing off the hydrochloric acid from the residual sawdust and evaporating said hydrochloric acid containing solution to a heavy consistency, recombining the residual sawdust and evaporated hydrochloric acid and evaporating the mixture to dryness, and activating the residue from said second evaporation with phosphoric acid.

8. The process of preparing activated carbon which comprises comminuting a vegetable substance, treating the comminuted substance with an alkaline solution to dissolve therefrom resinous constituents, further treating said comminuted substance with an acidic solution thereby to destroy its cellular structure, evaporating the excess acidic solution, and activating the resultant residue by heating it in contact with phosphoric acid.

FREDERICK E. KERN.